W. POPPELREUTER.
AUTOMATIC WORK RECORDING APPARATUS.
APPLICATION FILED NOV. 20, 1919. RENEWED JULY 26, 1922.

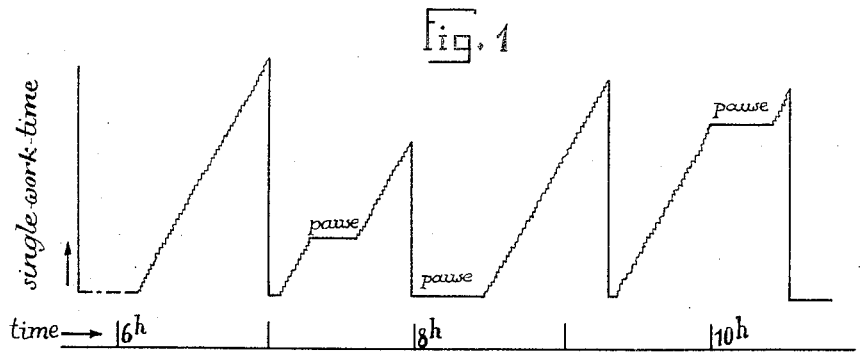
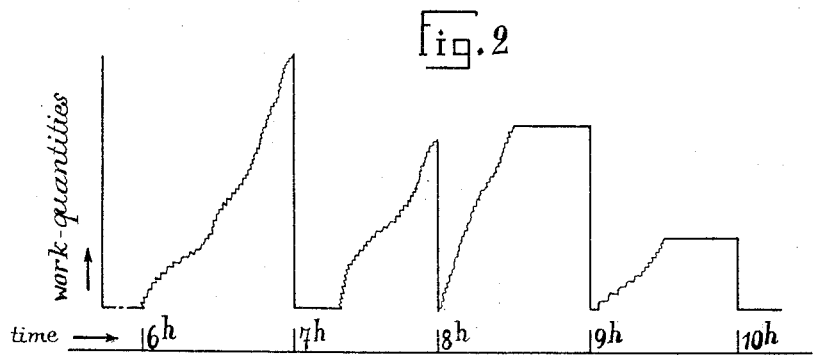
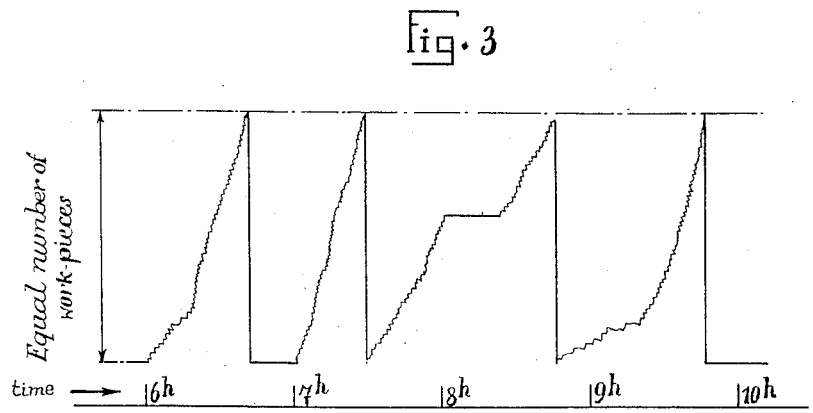

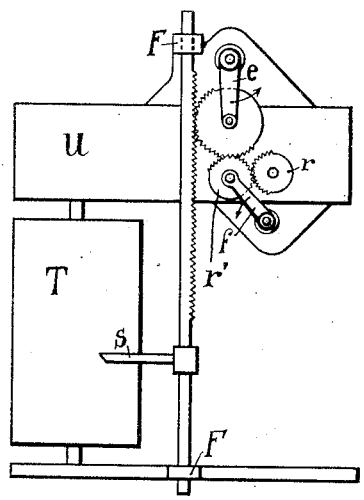
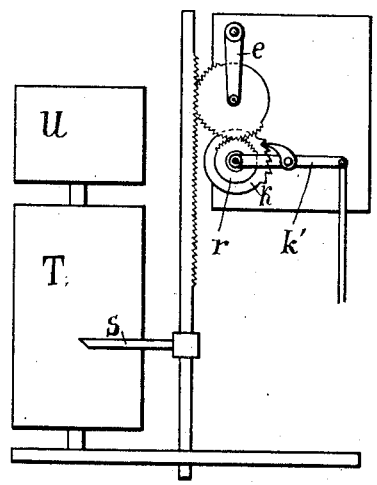
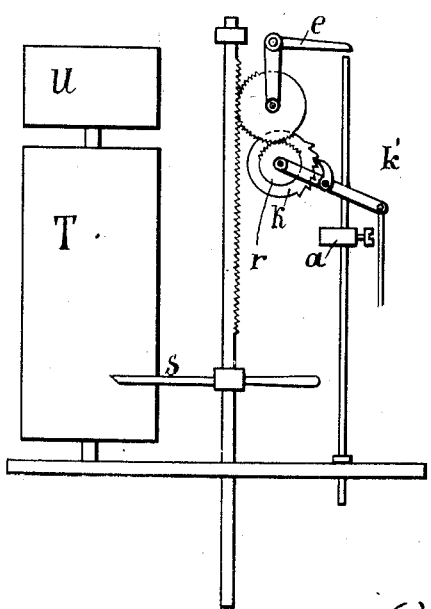

1,431,597.

Patented Oct. 10, 1922.
5 SHEETS—SHEET 3.

Inventor.

Walther Poppelreuter

W. POPPELREUTER.
AUTOMATIC WORK RECORDING APPARATUS.
APPLICATION FILED NOV. 20, 1919. RENEWED JULY 26, 1922.

1,431,597.

Patented Oct. 10, 1922.

*Inventor.*
Walther Poppelreuter

W. POPPELREUTER.
AUTOMATIC WORK RECORDING APPARATUS.
APPLICATION FILED NOV. 20, 1919. RENEWED JULY 26, 1922.
1,431,597.
Patented Oct. 10, 1922.
5 SHEETS—SHEET 5.
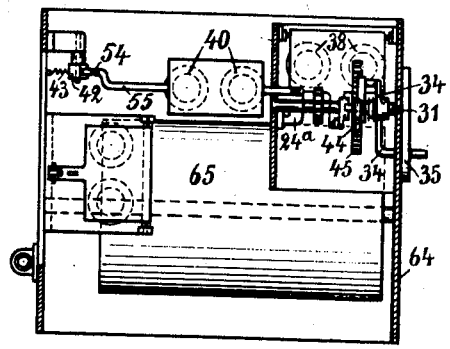
Fig. 12
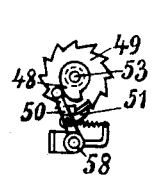
Fig. 14
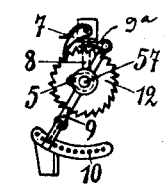
Fig. 15
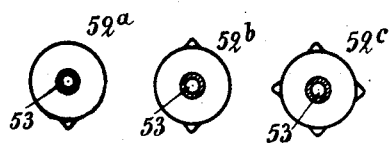
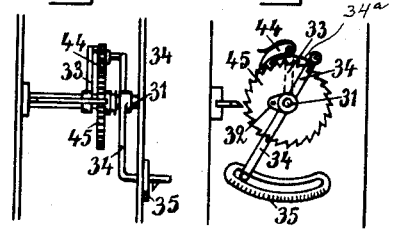
Fig. 16  Fig. 17
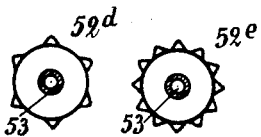
Fig. 13
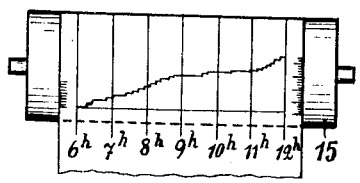
Fig. 18
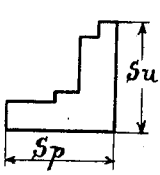
Fig. 19
Inventor.
Walther Poppelreuter Patented Oct. 10, 1922.

1,431,597

UNITED STATES PATENT OFFICE.

WALTHER POPPELREUTER, OF BONN, GERMANY.

AUTOMATIC WORK-RECORDING APPARATUS.

Application filed November 20, 1919, Serial No. 339,528. Renewed July 26, 1922. Serial No. 577,758.

*To all whom it may concern:*

Be it known that I, WALTHER POPPELREUTER, a citizen of Germany, residing at Bonn, Kaiser Karl--, Ring 22, have invented a new and useful Automatic Work-Recording Apparatus, and I do hereby declare the following to be a full, clear, and exact description of the invention, such as will enable others skilled in the art to which it appertains to make and use the same.

This invention relates to an apparatus for automatically recording interrupted or uninterrupted intellectual or physical functions of work executed by men or men-operated machines. The invention has for its primary object to provide an apparatus of the said kind, the records of which allow measuring, judging and improving the speed of the functions following each other and their legal condition in long sections of time. The improvements which the records will show to be necessary, may be obtained by changing, through foreign- or self-control, the kind of work executed by one man or the other or the working-systems, machines or processes. The constantly repeating functions to be recorded may be of a mechanico-mental kind such as calculating and copying (typewriting) or of a technical kind such as cutting patterns, operating machine-tools (shaping-machines, lathes, etc.).

With these and other ends in view my invention consists in the arrangement, construction and combination of parts to be herein described and particularly pointed out in the appended claims.

In the drawings:

Figs. 1, 2 and 3 illustrate different curves made by my new recording apparatus;

Figs. 4, 5 and 6 are diagrammatic views of the several mechanisms of which the apparatus is composed;

Fig. 12 is a cross-sectional view according to line C—D of Fig. 8;

Fig. 13, 14, 15, 16 and 17 illustrate details of the apparatus.

Fig. 18 illustrates a recording drum with a paper-strip showing a special kind of record-line;

Fig. 19 is a diagrammatic view illustrating another record-line.

Figure 7:
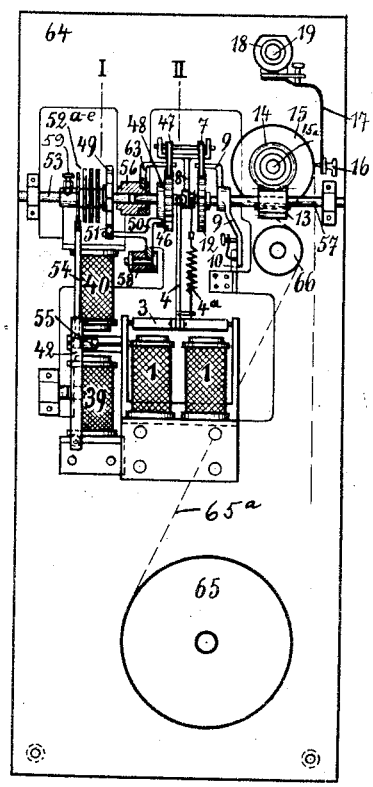
Fig. 7 is a side elevation of the apparatus, seen from the left, Fig. 8.

In order to fully explain the nature of the invention, it will be necessary to first describe and illustrate it mathematically and diagrammatically.

On account of the large variety of the operations or functions that are to be recorded, a recording principle had to be found which is adapted for all or at least most kinds of work.

This principle consists in representing one beside the other the several partial outputs of work temporarily succeeding each other as ordinate-like figures on an abscissa which represents the total working-time.

The principle is illustrated by three main types of recording curves.

Type I, as shown in Fig. 1, indicates work-piece time-curves. The total work of a day or of a certain section of time is characterized by the successive production of a number of work-pieces such as the installing of valves in wholesale manufacture. It is supposed that the workman makes 12 of those partial works within 10 hours every day. Now, it is of interest to see and to record how much time the workman has applied to each single piece what pauses he has made, how quickly and regularly he has worked, whether he has worked with skill or without skill and whether he has become tired while working. Skill shows itself in shortening the work-time, while tiring out shows itself in lengthening the work-time. From the standpoint of management, it is important to know at what time of the day a certain work-piece, for example the 5th valve, has been made.

Type II, as shown in Fig. 2, indicates work-quantity-curves.

Type III, as shown in Fig. 3, indicates work-piece counting-curves.

Experience has shown that, with these three types of curves, it is possible to record in a scientific and practical manner nearly all existing work-functions of a wholesale kind by applying technical means to accomplish these mathematical modes of representation.

This recording may be technically realized in two different ways: On the one hand a special construction for each type (in all 3 constructions) may be made, on the other hand all three types may be united in one suitable universal construction. The latter is deemed the preferable form of my invention. Before describing this my preferred form, I will, for the sake of clearness, first describe the most simple technical means upon which the three types of recording are based and which, in a combined and improved form, are united in a universal apparatus.

For drawing the work-piece time-curves according to type I (Figs. 1 and 4) the fundamental mechanism is as follows. T is a recording drum of well-known kind which is driven from a clockwork U. Parallelly to the axis of the drum T are arranged guides F, in which a rack-bar carrying a stylus S is movable up and down. The stylus can travel vertically upwards from the zero-line at the lower margin of the paper-strip, this movement being imparted to the rack-bar by means of a gear-wheel $r$ driven through the clockwork U or another clockwork. Between the driving gear $r$ and the rack-bar carrying the stylus is arranged a clutch $e$, for example in the form of a swinging intermediate gear-wheel. When the clutch is thrown in, the rack-bar with the stylus is drawn upwards. The stylus is of such weight that it drops to the zero-line when it is free, i. e. when the clutch is disengaged.

The several sections of time applied to the work-pieces are measured by giving to the clockworks, which drive the drum T and the gear wheel $r$, a speed conforming to the duration of the working-functions to be measured. At the beginning of the first work-time the clutch is let in so that the stylus begins to rise. At the end of the work-time, the clutch is disengaged so that the stylus drops to its initial position. In order to record a pause occurring during the work-time, the stylus is brought to a standstill by disengaging the connection between the driving gear $r$ and the rack-bar; this may be effected by means of lever $f$ swingingly carrying another gear wheel $r'$. The disengagement is of such kind, however, that the stylus is prevented from dropping. In order to attain this, the gear-wheel, which forms part of the clutch $e$ and which engages the rack-bar is frictionally mounted, the friction being of such a degree that it cannot be overcome by the weight of the rack-bar. As long as the said gear-wheel is held in engagement with the rack-bar, the latter cannot drop. The dropping of the rack-bar can only be effected by throwing the said gear-wheel laterally out of engagement with the rack-bar. By disengaging the gear-wheel $r'$ from the train of gears, the driving motion for the rack-bar is interrupted, but the rack-bar itself is held from dropping.

Considering the recording of the quantities of work according to type II (Figs. 2 and 5), the clockwork U only drives the drum T. The gear wheel $r$, which causes the raising of the rack-bar with the stylus, is driven from a ratchet wheel $k$ operated by a ratchet lever $k'$. Each time a part of the work-quantity is delivered, a small rotative motion is imparted to the gear-wheel $r$ by lifting the ratchet lever $k'$, thereby causing the stylus to travel upwards. The clutch $e$ between the rack-bar and the driving gear wheel $r$ is disengaged in regular periods (for example every hour), whereupon the stylus drops to the zero-line in order to rise again upon the clutch being re-engaged.

As to the mechanism for recording the work-piece counting-curves according to type III (Figs. 3 and 6), the driving of the drum T by clockwork U and of the ratchet wheel $k$ by means of a ratchet lever $k'$ which is operated every time a work-piece is manufactured, is the same as in Fig. 5. The only difference is that the clutch $a$ is not disengaged in regular periods of time by a clock but by an adjustable stop $a$ which will be engaged by the stylus when the latter has reached the position which it takes after a certain number of work-pieces has been finished. After this position has been reached, the stylus drops to the zero-line just for a moment and commences at once to rise anew.

The described modes of recording may also be executed by devices of other constructions, in which the several parts and their combination are replaced by equivalents and in which some of the systems of recording are united in one common apparatus. The following is a description of the universal apparatus which I deem the most preferable form of my invention and which is electrically operated instead of by clockworks.

Referring now to Figs. 7–17, in which similar letters of reference indicate corresponding parts, 64 is a frame in which a recording-paper feeding-mechanism of any well-known kind and operated by intermittent electric impulses is provided. 65 is a paper feed roller from which a paper-strip 65$^a$ adapted to receive the record moves over a guiding roller 66 and round a recording drum 15 from which it passes vertically downwards. The drum 15 is rotated by means of worm wheels 14 and 13 the former of which is fastened to a shaft 15$^a$ which carries the drum 15. The worm wheel 13 (Figs. 7 and 8) is mounted on a shaft 57 and moved by means of a ratchet wheel 12 (Figs. 7 and 15) which is likewise fixed to the shaft 57. The ratchet wheel 12 is rotated by a radially operating pawl 7 which is carried by one end of a double-armed lever 8, 5, the lower arm 5 of which is pivotally connected to the armature 3 of an electromagnet 1 by means of rod 4 which is normally drawn upwards by a spring 4ª. When the electromagnet 1 is energized by a short electric impulse the armature 3 is attracted, thereby pulling at the rod 4 and causing the pawl 7 to rotate the ratchet wheel 12 for a turn of one or more teeth, thereby causing the paper-strip 65ª to be advanced a corresponding amount. The speed of the feeding motion is on the one hand dependent on the intervals of the electrical impulses, which may be between 1 and 6 seconds, and on the other hand on the adjustment of the ratchet wheel 12 for rotation of a certain number of teeth, viz. 1 to 6, at every stroke of the pawl 7. The latter adjustment may be effected by means of a lever 9 which is loosely mounted on the shaft 57 and which can be fixed in different positions on a segment 10. To the free end of the lever 9 is fastened a leaf-spring 9ª which, according to the angular position of the lever 9, overlaps certain numbers of teeth of the ratchet wheel 12 between the two end-positions into which the lever 8 may be brought. The adjustment may therefore be so that the pawl 7 will engage the teeth at the beginning of its stroke or that it will first have to glide over the leaf-spring 9ª before coming into engagement with the teeth of the ratchet wheel and causing its rotation. As the deflection of the pawl 7 is always the same, the rotation of the ratchet wheel for more or less teeth therefore depends upon whether the number of teeth covered by the leaf-spring 9ª between the end-positions of the movement of pawl 7 is large or small.

The frame 64 further contains a stylus guided parallelly to the axis of the recording drum 15.

Figure 8:
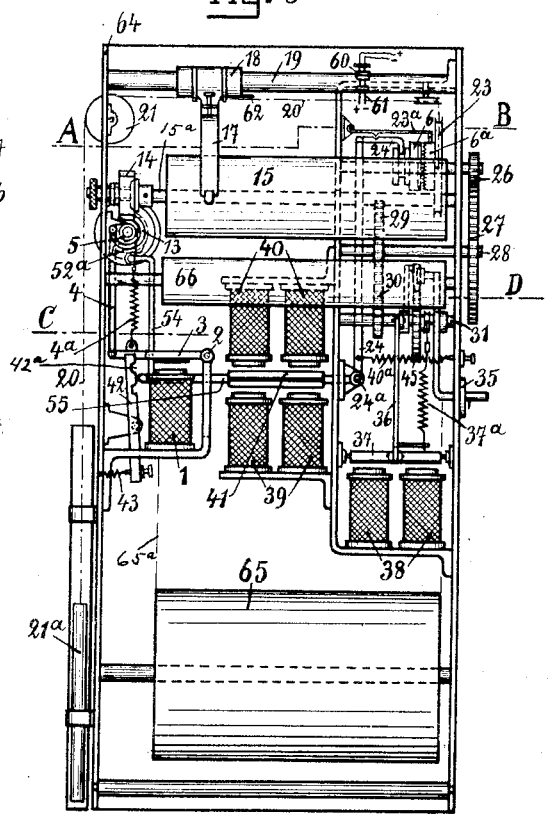
Fig. 8 is a front elevation of the same.
Figure 9:
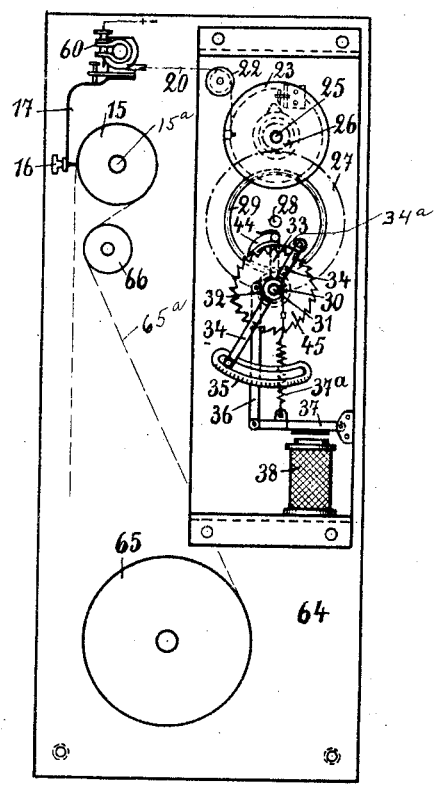
Fig. 9 is another side elevation of the same, seen from the right, Fig. 8.
Figure 10:
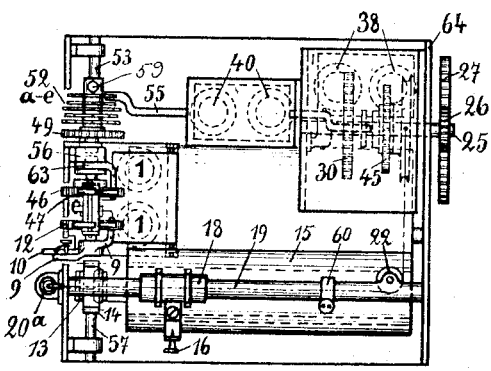
Fig. 10 is a plan view of the apparatus.
Figure 11:
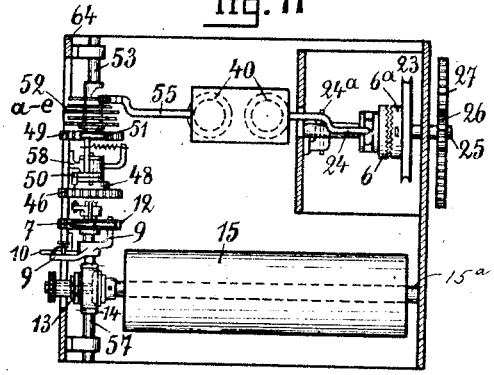
Fig. 11 is a cross-sectional view according to line A—B of Fig. 8.

Parallelly fastened in the frame 64 with regard to the recording drum is a guiding rod 19 on which is movable a sleeve 18 to which is resiliently and adjustably fastened an arm 17 which carries the stylus 16. When the stylus is moved from the left to the right (Fig. 8), it will draw a straight line on the recording drum when the same is at rest. The guiding sleeve 18 is fastened to a cable 20, one end of which is guided over a roller 21 and fastened to a counterweight 21ª, while the other end is guided over rollers 22 and fastened to a grooved pulley 23 (Figs. 8 and 9). The motion of the stylus is effected as follows: An electromagnet 38 operates on a rod 36 by means of an armature 37 which is held in elevated position by a spring 37ª. The rod 36 is connected to the short arm 32 of a double-armed lever, the other arm 33 of which carries a pawl 44 which is in engagement with a ratchet wheel 45 which is fastened to a shaft 31. As described with regard to ratchet wheel 12, the number of the teeth of ratchet wheel 45 carried along at every stroke of the pawl 44 may be varied by means of a lever 34 which is adjustable in a segment 35 and which by means of a leaf spring 34ª may overlap a certain number of teeth of the ratchet wheel 45. When the ratchet wheel 45 is rotated, it causes at the same time through its shaft 31 a gear wheel 30 to be rotated. Gear 30 engages a gear 29 mounted on a shaft 28 which at its free end carries a gear wheel 27. The gear wheel 27 in turn is in engagement with a gear wheel 26 fastened to the shaft 25 which carries the grooved pulley 23. By interchanging the gear wheels 26 and 27 the speed of the transmission can be varied at will. The grooved pulley 23 is loosely mounted on the shaft 25. Rigidly fixed to the pulley 23 is a clutch member 6ª which can be brought into engagement with another clutch member 6, which is slidable but not rotatable on the shaft 25.

When the clutch members are engaged and the rachet wheel 45 is moved through the electric impulses energizing the electromagnet 38, the cable 20 is wound up on the grooved pulley 23, whereby the stylus 16 is moved intermittently from the left to the right, so that a straight line is drawn on the inoperative recording drum. Another means enclosed in the frame 64 is a device for engaging and disengaging the guiding mechanism for the stylus.

The clutch member 6 is shifted by means of a suitably bent lever 24 which is pivotally mounted at 24ª and connected to a double armature 41. The armature 41 is situated between the electromagnets 39 and 40. When the electromagnet 40 is energized, the armature 41 is drawn upwards thereby swinging the lever 24 so as to cause the engagement of the clutch 6, 6ª. The clutch will be disengaged when electromagnet 39 is energized.

In order to hold the armature 41, which is only intermittently operated, in its different positions, it is provided with an extension 55. The extension is in contact with an arm 42 which is pivotally mounted on the frame 64 and resiliently held in position by means of a spring 43. The arm 42 is provided with recesses 42ª adapted to receive the end of the extension 55. When the clutch is disengaged, the stylus 16 does not take part in the movement of the gears 30, 29, 27, 26 but it is drawn to the left through the weight 21ª. Consequently when the clutch is disengaged, the stylus remains in its extreme left position drawing the zero-line on the recording drum 15 when same is moved. When the clutch is engaged, the stylus is moved to the right through the medium of the gears 30, 29, 27, 26, the grooved pulley 23 and the cable 20. When the clutch is again disengaged, the weight 21ª drops and rapidly withdraws the stylus 16 to the zero-line. When the clutch is held engaged while the gearing 30, 29, 27, 26 is stopped through an interruption of the current energizing the electromagnet 38, the stylus remains in the position which it has reached and draws on the recording drum or paper-strip, respectively, a line running parallelly to the zero-line.

As described, the apparatus is adapted to record the work-piece time-curves according to type I (Fig. 1). In order to record the work-quantity-curves according to type II (Fig. 2), the electromagnet 38 is energized in regular intervals, such as all seconds, while the magnet 40 is energized by an electric impulse at the beginning and magnet 39 at the end of the work.

The recording of the work-piece time-curves takes place as follows: The electromagnet 1 and the electromagnet 38 are energized every 1 or 6 seconds by electric impulses from a suitable clock. The paper-strip 65ª begins to move intermittently and uniformly over the recording drum 15. The clutch 6, 6ª being still disengaged, the gearing 30, 29, 28, 27, 26 moves without influencing the stylus which is held in its inoperative position and draws the zero-line, when the first piece of work commences and it is assumed that an observer should record the work, the electromagnet 40 is energized, so that the clutch 6, 6ª will be engaged. The stylus is thus given a step by step motion from the left to the right, the cable 20 being wound up on the grooved pulley 23. According to whether the work to be recorded is a rapid or a slow operation, the number of teeth of the ratchet wheel 45 to be intermittently advanced and thereby the stroke are suitably adjusted, for example, for about $\frac{1}{10}$ mm. every 6 seconds. This adjustment is made prior to starting the apparatus. A line rising obliquely or scalariformly (Fig. 1) is thus drawn on the paper-strip. When the first piece of work has been finished, the electromagnet 39 is energized and the clutch 6, 6ª disengaged, so that the stylus rapidly returns to the zero-line under the influence of the weight 21ª. The first time-curve of a piece of work has thus been recorded in accordance with type I. When a pause is made before beginning the second piece of work, said pause will be represented as a part of the zero-line, since in that case the stylus remains in its zero-position. When the second piece of work begins, the stylus moves again to the right, at the end returns to the zero-line etc. If a pause, made during the work, should be represented, the current-supply to the electromagnet 38 is interrupted at the beginning and switched on again at the end of the pause.

Since the clutch remains engaged during this pause, the stylus remains in the distance from the zero-line which it had reached at the beginning of the pause; the pause is represented as a line interrupting the oblique lines and running parallelly to the zero-line. If the apparatus should be used for recording the curves which indicate the quantities of work according to type II (Fig. 2), the electric impulses which mark the quantity (for example one impulse every time the die of a punching press moves downward), are conducted to the electromagnet 38, thereby causing the stylus to be moved step by step to the right at the speed of the progressing total work. This can also be effected mechanically instead of electrically by connecting for example the machine through a suitable cable to the rod 36. This connection is to be made in accordance with the circumstances. In this case, the arm 42 is held in inoperative position and a spring 40ª is fastened to the lever 24 causing the latter to be held in the position in which the clutch 6, 6ª remains constantly engaged. If now, in the desired sections of time, such as for example every half hour or every hour, short electric impulses are conducted from a main electric clock to the electromagnet 39, the clutch 6, 6ª is each time disengaged for a short moment and then immediately re-engaged. The electromagnet 40 remains entirely uninfluenced. When the workman or machine continues the work, the stylus, after having returned to the zero-line, begins again the movement to the right. When the workman or machine make a pause, the motion of the gearing 30, 29, 28, 27, 26 is stopped and while the clutch is held engaged, only the zero-line or a line parallel to the same is drawn.

Besides the mechanism described heretofore, the apparatus is provided with means for automatically stopping the operation at certain time-intervals.

If many apparatuses with main signals of different lengths are used for making records of the quantities of work, it would be obviously cumbersome to impart the main signals to the apparatuses by means of a central clock. Therefore, every apparatus is provided with means for automatically causing the disengagements to take place after 60, 30, 10 minutes etc., which may be carried out mechanically.

The lever 8, which is moved by the electromagnet 1, carries besides the pawl 7 another pawl 47 (Fig. 7) which engages a ratchet wheel 46 loosely mounted on the shaft 57. Adjacent to the ratchet wheel 46, a lever 63 similar to lever 9 is provided which is adjustable on a segment similar to segment 10 and by means of which the number of teeth advanced at every stroke of the pawl carried by the lever 63 may be varied by covering more or less teeth of the ratchet wheel 46. The adjustment is generally made so that only one tooth of the ratchet wheel 46 is held free to be engaged and advanced by the pawl 47 without regard to whether the ratchet wheel 12 is adjusted for advancement of 3 or 6 teeth at every stroke. If an electric impulse is produced every 6 seconds, the ratchet wheel 46 is preferably provided with 50 teeth so that the ratchet wheel will make one revolution within every 5 minutes. Rigidly connected with the ratchet wheel 46 is a cam 48 (Fig. 14) with which a lever 50 is resiliently held in contact which is pivotally mounted in a bearing 58. From its initial position the lever 50 is gradually raised during the rotation of the ratchet wheel 46 and suddenly snaps back to its initial position at the end of every revolution, i. e. once every 5 minutes. The lever 50 has a lateral arm 50$^a$ which carries a pawl 51 engaging a ratchet wheel 49 which has 12 teeth. The ratchet wheel 49 is mounted on a shaft 53, one end of which is rotatably supported in a bearing 56 independently of the shaft 57. The direction of the teeth of the ratchet wheel 49 is such that the latter is rotated 1 tooth at the moment the lever 50 springs back to its initial position, i. e., once within 5 minutes. The construction illustrated in the drawings is such as to allow of the mechanism recording the work-quantity-curves to be stopped every 5, 10, 15, 30 or 60 minutes. For this purpose, the shaft 53 which carries the ratchet wheel 49, is provided with a set of 5 wheels 52$^a$, 52$^b$, 52$^c$, 52$^d$, 52$^e$ which have on their peripheries 1, 2, 4, 6 or 12 projecting lugs (Fig. 13). This set of wheels 52$^{a-e}$ is shiftable on the shaft 53 in a groove and by means of a resilient button 59 which may be fixed in five different positions on 5 marks of a scale provided on the shaft 53. The ratchet wheel 49 and the wheels 52$^{a-e}$ make one revolution within every hour, because ratchet wheel 46 makes a partial revolution of 360° : 12=30 degrees every 5 minutes.

This set of wheels mechanically causes the disengagement of the mechanism moving the stylus. The extension 55 of lever 24 has rigidly attached thereto a rod 54 which is operated upon by one of the wheels 52$^{a-e}$, when one of the projecting lugs of the wheels 52$^{a-e}$ strikes the upper end of the rod 54, same is pressed downwards, so that the clutch 6, 6$^a$ is, for an instant, disengaged by the lever 24 and immediately thereafter re-engaged. According to which of the wheels 52$^{a-e}$ is adjusted to operate on the rod 54, the short disengagement of the clutch 6, 6$^a$ takes place every 5, 10, 15, 30 or 60 minutes. In this manner, the stylus always returns to the zero-line after a certain period of time has elapsed. The electromagnets 39 and 40 need not be operated then.

In case work-quantity-curves are not to be recorded or if the disengagements should be effected by the electromagnet 39, the entire mechanism 46 to 59 can be held inoperative by shifting the pawl 47 into an inoperative position.

For recording the work-piece counting-curves the following means are provided. According to Figs. 3 and 6 these curves are produced by causing the stylus (as in Figs. 2 and 5) to progressively move to the right proportionally to the executed single works and to return to the zero-line after it has reached a certain position which takes place after a definite number of single works has been finished.

The guiding rod 19, which is preferably provided with a scale, carries a clamp-member 60 which may be shifted to and fixed in different positions. This clamp-member 60 is provided with two terminals insulated one from the other and forming a spring contact 61. A pin 62 is fastened to the sleeve 18 of the stylus. This pin is adapted to engage and close the said spring contact, when the stylus has reached a definite position to the right. The wires of said contact are connected to the electromagnet 39 which, when the spring contact 61 is closed, causes the disengagement of the clutch 6, 6$^a$. The stylus then returns to the zero-line but is immediately drawn to the right again, because the clutch 6, 6$^a$ is re-engaged as soon as the pin 62 has left the contact 61.

In the foregoing, the main registrations are only described. The apparatus may, however, also be used for other registrations which in certain cases may prove very profitable.

In the record illustrated in Fig. 18, the electric impulses which are produced regularly in accordance with the progress of the work-time (for example from 6 to 12 o'clock), are not led to the recording-drum but are caused to operate on the stylus through the electromagnet 38. If then the impulses, which are produced during the deliverance of a quantity of work and which correspond to a respective number of single works, are led to the recording drum through the electromagnet 1, the piece of unrolled paper-strip gives a proportional measure of the deliverance of the quantities of work with relation to the time which is to be read from the paper-strip in horizontal i. e. transverse direction of the strip. If the paper is provided in the direction of its travel with a numeral scale instead of with a time-scale, it clearly shows the total quantity of work performed in a certain time, for example in a shift of 6 hours, disclosing at the same time the pauses made and the speed of the deliverance of the individual quantities of work.

The last-mentioned sort of recording has proved itself very useful for automatically controlling the uninterrupted and uniform operation of machines. If the machine operates uniformly and without interruption, the stylus will draw an oblique straight line on the paper-strip. If, however, variations occur in the operation of the machine, this will be disclosed by irregularities of the line recorded. The necessary electrical or mechanical impulses may be easily produced by a cam on a rotating element of the machine to be controlled.

Without deviating from the principles of my invention, the apparatus may also be used for making Taylor-studies by recording the several time pauses one beside the other as time sections instead of recording the several times applied to the piece-works.

In industrial practice has largely been adopted the process of recording as phases of time-studies the productive and non-productive times alternating one with the other. If these are recorded as shown in Fig. 19, by representing the productive times as vertical lines and the unproductive times as horizontal lines, one obtains, when the stylus drops at the end of the total work, in the abscissa the sum of the unproductive times and in the ordinate the sum of the productive times as also the record of the single phases. This sort of recording may be executed by inserting in the conductors leading to the electromagnets 1 and 38, which are operated by ½ second-impulses, an alternating switch, so that the current-impulses either go to the electromagnet 1 and cause rotation of the recording drum or to the electromagnet 38 and cause the motion of the stylus. The engagement and disengagement of the clutch is then caused as described with relation to type I: work-piece time-curves.

It is obvious that further modifications may be made in the construction shown and above particularly described within the principle and scope of my invention.

What I claim as new and desire to secure by Letters-Patent, is:—

1. A work recording apparatus, comprising in combination a recording surface, means for uniformly moving said recording surface in a certain direction, a stylus held in contact with said recording surface and movable transversely to the direction of the travel of said surface, a cable intermediately fastened to the stylus, a weight at one end of said cable, a grooved pulley having the other end of the cable attached to it, a clutch member fixed to the grooved pulley, another clutch member adapted to cooperate with the first-mentioned one, a lever for engaging and disengaging the clutch members, and means for imparting a step by step rotation to one of the clutch members.

2. A work recording apparatus, comprising in combination a recording surface, means for uniformly moving said recording surface in a certain direction, a stylus held in contact with the recording surface and movably transversely to the direction of travel of said surface, a cable intermediately fastened to the stylus, a weight at one end of the cable tending to draw the latter in one direction, a driving shaft, a grooved pulley loosely mounted on the driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch members, means for imparting a step by step rotation to the driving shaft, and a clock adapted to operate on the said lever for causing the clutch to be disengaged and re-engaged at certain intervals of time.

3. A work recording apparatus, comprising in combination a recording surface, means for uniformly moving said recording surface in a certain direction, a stylus held in contact with the recording surface and movable transversely to the direction of the travel of said surface, a cable intermediately fastened to the stylus, a weight at one end of the cable tending to draw the latter in one direction, a driving shaft, a grooved pulley loosely mounted on the driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch members, means for imparting a step by step rotation to the driving shaft, a stop engageable by the stylus and adapted to operate on the said lever for causing the same to disengage and reengage the clutch.

4. A work recording apparatus, comprising in combination a recording surface, means for uniformly moving said recording surface in a certain direction, a stylus held in contact with the recording surface and movable transversely to the direction of the travel of said surface, a cable intermediately fastened to the stylus, a weight at one end of the cable tending to draw the latter in one direction, a driving shaft, a grooved pulley loosely mounted on the driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch member, an electromagnet having an armature adapted to operate on a ratchet and pawl mechanism, this mechanism being in driving connection with the driving shaft for imparting to the latter a regularly equal partial-rotation at every closing of the circuit of said electromagnet.

5. A work recording apparatus, comprising in combination a recording surface, means for uniformly moving said recording surface in a certain direction, a stylus held in contact with the recording surface and movable transversely to the direction of the travel of said surface, a cable intermediately fastened to the stylus, a weight at one end of the cable, a driving shaft, a grooved pulley loosely mounted on the driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch members, an electromagnet having an armature adapted to operate on a ratchet and pawl mechanism, said mechanism being in driving connection with the driving shaft, and a circuit-closing-contact in the circuit of the said electromagnet, said closing-contact adapted to be controlled by a clock for causing the driving shaft to be uniformly rotated step by step.

6. A work recording apparatus comprising in combination a roller, a recording paper-strip wound on said roller, an electromagnet whose armature is connected with a ratchet and pawl mechanism for imparting a step by step rotation to the said roller to uniformly move the paper-strip in a certain direction, a stylus held in contact with said paper-strip and movable transversely to the direction of the travel of the paper-strip, a cable intermediately fastened to the stylus, a weight at one end of the cable, a driving shaft, a grooved pulley loosely mounted on the driving shaft and having the other end on the cable attached to it, a clutch member fixed to the grooved pulley, another clutch member slidably mounted on the driving shaft and adapted to cooperate with the first-mentioned clutch member, a lever for engaging and disengaging the clutch members, an electromagnet having an armature adapted to operate on a ratchet and pawl mechanism which is in driving connection with the driving shaft for imparting to the latter a regularly equal partial-rotation at every closing of the circuit of the said electromagnet.

7. A work recording apparatus, comprising in combination a roller, a recording paper-strip wound on said roller, an electromagnet, a ratchet and pawl mechanism between the armature of the electromagnet and the said roller, a circuit-closing-contact in the circuit of the electromagnet operating on the said roller, a clock connected with the circuit-closing-contact for imparting a uniform step by step rotation to the roller to uniformly move one paper-strip in a certain direction, a stylus held in contact with said paper-strip and movable transversely to the direction of the travel of the paper-strip, a cable intermediately fastened to the stylus, a weight at one end of the cable, a driving shaft, a grooved pulley loosely mounted on said driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch members, an electromagnet having an armature adapted to operate on a ratchet and pawl mechanism which is in driving connection with the driving shaft for imparting to the latter an equal partial-rotation at every closing of the circuit of the last-mentioned electromagnet.

8. A work recording apparatus comprising in combination a roller, a recording paper-strip wound on said roller, an electromagnet for imparting a step by step rotation to the said roller to uniformly move the paper-strip in a certain direction, a stylus held in contact with said paper strip and movable transversely to the direction of the travel of the paper-strip, a cable intermediately fastened to the stylus, a weight at one end of the cable, a driving shaft, a grooved pulley loosely mounted on the driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch members, a spring attached to said lever tending to hold the clutch engaged and an electromagnet for moving the lever into position to disengage the clutch, another electromagnet having an armature adapted to operate on a ratchet and pawl mechanism, this mechanism being in driving connection with the driving shaft for imparting to same an equal partial-rotation at every closing of the circuit of the last-mentioned electromagnet.

9. A work recording apparatus, comprising in combination a roller, a recording paper-strip wound on said roller, an electromagnet whose armature is connected with a ratchet and pawl mechanism for imparting a step by step rotation to the said roller to uniformly move the paper-strip in a certain direction, a circuit-closing-contact in the circuit of the electromagnet operating on the said roller, a clock operatively connected with the circuit-closing-contact for imparting a uniform step by step rotation to the roller to uniformly move the paper-strip in a certain direction, a stylus held in contact with said paper-strip and movable transversely to the direction of the travel of the paper-strip, a cable intermediately fastened to the stylus, a weight at one end of the cable, a driving shaft, a grooved pulley loosely mounted on the driving shaft and having the other end of the cable attached to it, a clutch member fixed to the grooved pulley, another clutch member slidably mounted on the driving-shaft and adapted to cooperate with the first-mentioned clutch member, a lever for engaging and disengaging the clutch members, a spring attached to said lever tending to hold the clutch engaged and an electromagnet for moving the lever into position to disengage the clutch, a clock for momentarily closing after the elapse of equal time-sections, the circuit of the electromagnet moving the clutch operating lever, another electromagnet whose armature is connected with a ratchet and pawl mechanism which in turn is in driving connecting with the driving shaft for imparting to same an equal partial-rotation at every closing of the circuit of the last-mentioned electromagnet.

10. A work recording apparatus, comprising in combination a roller, a recording paper-strip wound on said roller, an electromagnet, a ratchet and pawl mechanism between the armature of the electromagnet and the said roller, a circuit-closing-contact in the circuit of the electromagnet operating on the said roller, a clock connected with the circuit-closing-contact for imparting a uniform step by step rotation to the roller to uniformly move the paper-strip in a certain direction, a stylus held in contact with said paper-strip and movable transversely to the direction of the travel of the paper-strip, a cable intermediately fastened to the stylus, a weight at one end of the cable, a driving shaft, a grooved pulley loosely mounted on said driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch members, two oppositely acting electromagnets in connection with the said lever, one of the electromagnets serving to move the lever into the position to engage the clutch-members and the other electromagnet serving to move it into the position to disengage the clutch members, and another electromagnet having an armature adapted to operate on a ratchet and pawl mechanism which is in driving connection with the driving shaft for imparting to the latter an equal partial-rotation at every closing of the circuit of the last-mentioned electromagnet.

11. A work recording apparatus, comprising in combination a roller, a recording paper-strip wound on said roller, an electromagnet whose armature is connected with a ratchet and pawl mechanism for imparting a step by step rotation to the said roller to uniformly move the paper-strip in a certain direction, a stylus held in contact with said paper-strip and movable transversely to the direction of the travel of the paper-strip, a cable intermediately fastened to the stylus, a weight at one end of the cable, a driving shaft, a grooved pulley loosely mounted on the driving shaft and having the other end of the cable attached to it, a clutch member fixed to the grooved pulley, another clutch member slidably mounted on the driving shaft and adapted to cooperate with the first-mentioned clutch member, a lever for engaging and disengaging the clutch members, means for imparting a step by step rotation to the driving shaft, two oppositely acting electromagnets operating on the lever to move the clutch into operative or inoperative position, a ratchet and pawl mechanism adapted to act in unison with the first-mentioned ratchet and pawl mechanism for the paper-feed roller, a cam operable by the secondly mentioned ratchet and pawl mechanism, a lever moved by said cam, a set of shiftable wheels provided with different numbers of projections and liable to be rotated by the last-mentioned lever, and another lever held in contact with one of the wheels included in the said set and movable by the projections of the said wheels to disengage the clutch members.

In testimony whereof I have signed my name to this specification

WALTHER POPPELREUTER.